Patented Aug. 19, 1947

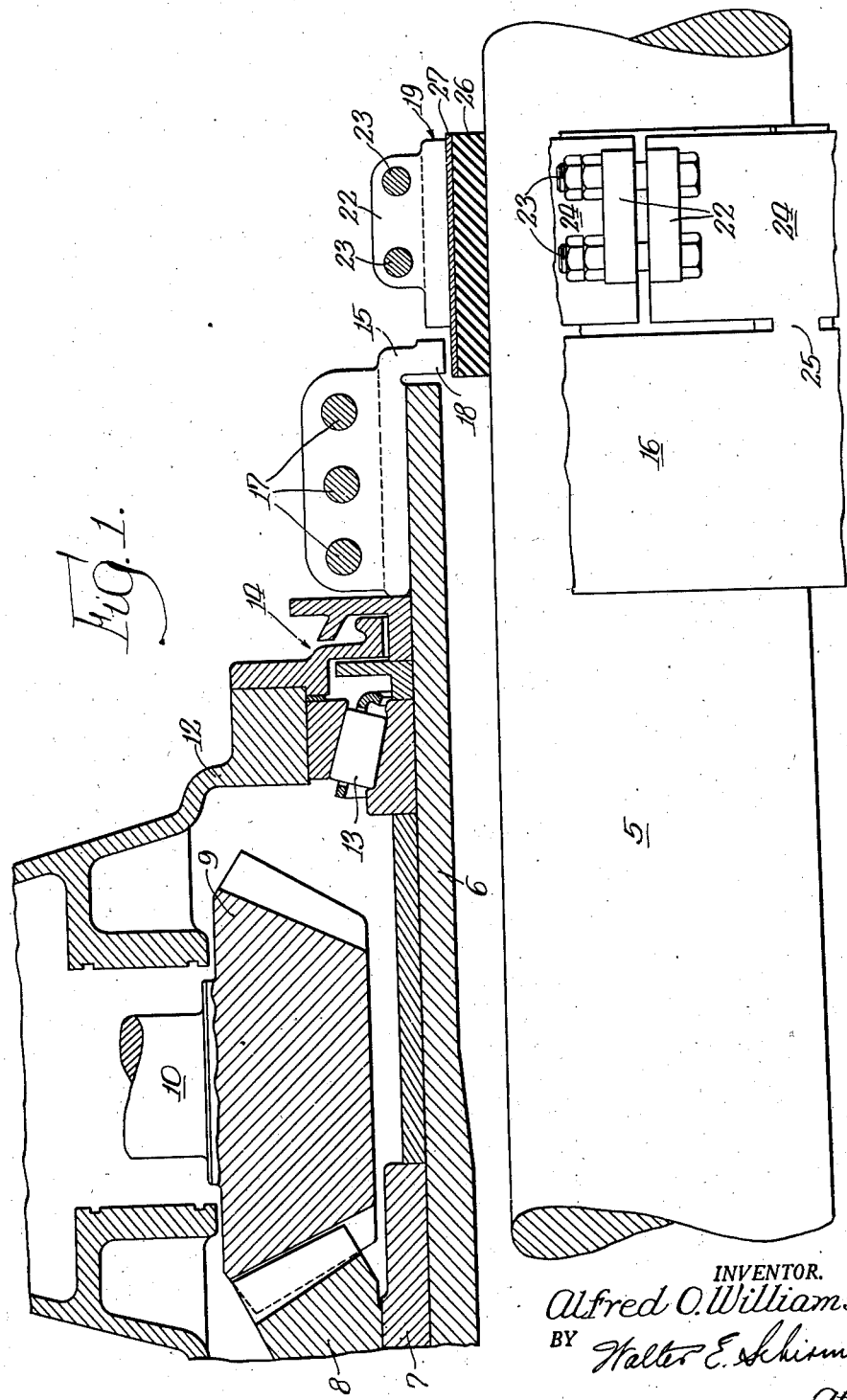

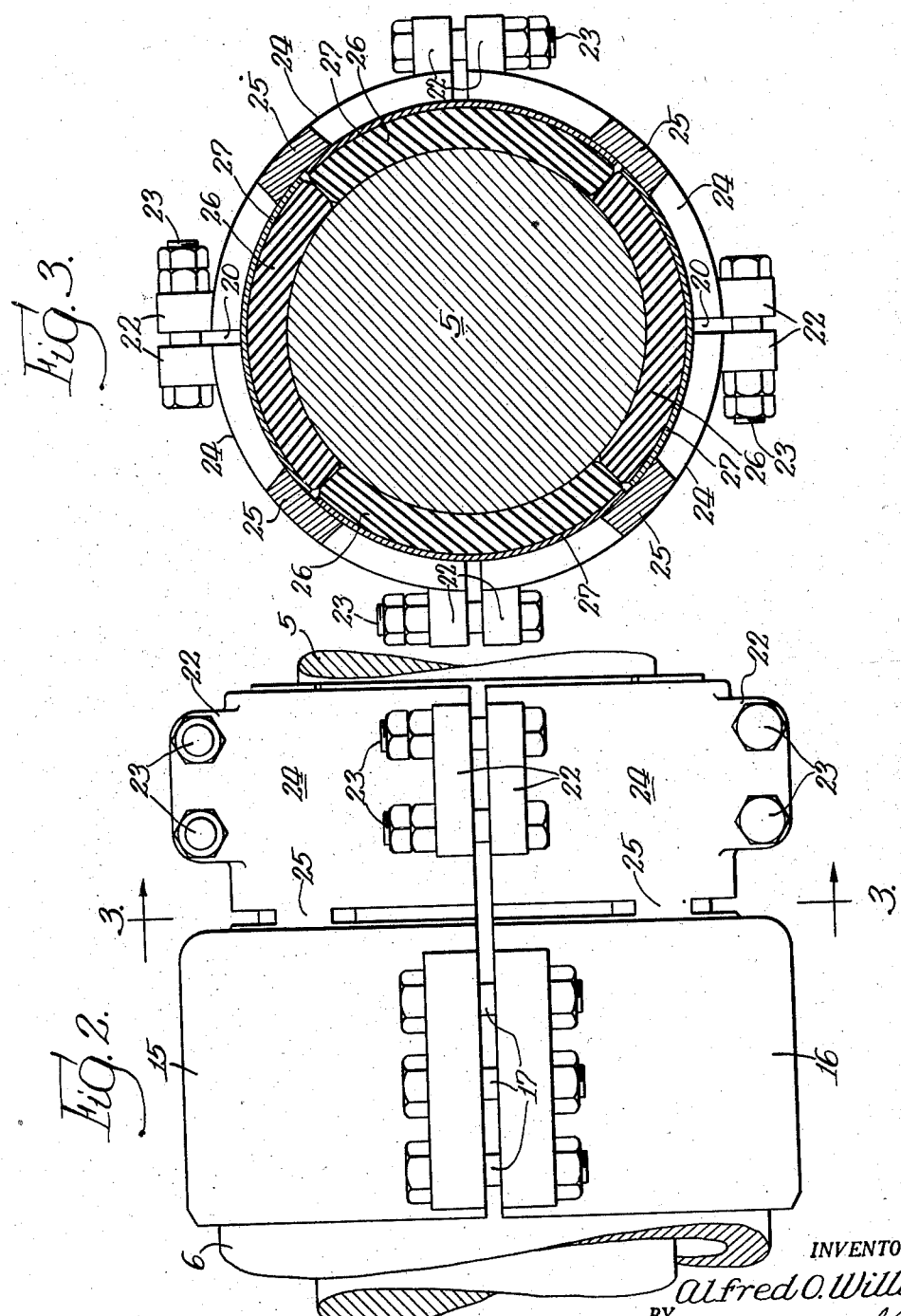

2,426,132

UNITED STATES PATENT OFFICE 2,426,132

AXLE GENERATOR DRIVE

Alfred O. Williams, Battle Creek, Mich., assignor to Clark Equipment Company, Buchanan, Mich., a corporation of Michigan Application July 19, 1944, Serial No. 545,713

6 Claims. (Cl. 64—11)

This invention relates to an axle generator drive whereby the axle of a rail truck or the like is utilized for driving a generator, and more particularly is directed to an improvement upon the quill support on the truck axle for a drive such as is disclosed in my copending application, Serial No. 536,849, filed May 22, 1944, now Patent Number 2,404,115, issued July 16, 1946.

In such construction the quill upon which is mounted the bevel gear which drives the shaft leading to the generator is mounted in radially spaced relation about the truck axle and is secured for driving connection at one end through a suitable rubber mounting to the wheel at the end of the axle. The opposite end of the quill is supported on an adaptor sleeve which in turn is clamped about the axle. The present invention relates to an improved construction of the adaptor sleeve to enable the quill to be trued for running even, although the axle may not have been machined at this point coaxially with the quill. Thus, the present construction is adaptable for assuring a true running quill when mounted on a rough unfinished axle.

One of the primary objects of the present invention is to provide an adaptor sleeve which is adapted to be clamped to the end of the quill and which is arranged for flexible support about the axle so that it can be adjusted to provide for any out-of-line relation between the axis of the quill and the surface upon which the adaptor sleeve is supported on the axle. This is accomplished by making the clamp portions which support the adaptor sleeve on the axle in such manner as to provide for flexibility so that the truing bolts which secure this end of the adaptor to the axle can be tightened in such manner as to provide the adjustment necessary. The truing operation thus provided is somewhat similar to that used by lathe operators in truing up a 4-jaw chuck. The flexibility of the construction is obtained by providing a milling cutter for milling radial slots into that portion of the adaptor sleeve between the quill and the axle so that this portion provides inherent flexibility, allowing the truing bolts to spring the end of the adaptor sleeve into trued position by clamping the rubber segments upon which the adaptor sleeve rests.

Other objects and advantages of the present invention will appear more fully from the following detailed description which, taken in conjunction with the accompanying drawings, will disclose to those skilled in the art the particular construction and operation of the preferred form of the present invention.

In the drawings:

Figure 1 is a transverse sectional view through the portion of the axle generator drive and adaptor sleeve;

Figure 2 is a side elevational view of the adaptor sleeve; and

Figure 3 is a sectional view taken substantially on line 3—3 of Figure 2.

Referring now in detail to the drawings, the rail truck axle is indicated generally at 5 and surrounding this axle is an elongated cylindrical quill 6 upon which is mounted the hub member 7 to which is connected the bevel gear 8. This bevel gear has driving engagement with the bevel pinion portion 9 of a drive shaft 10 leading to the generator. A split housing 12 encloses the ring gear 8 and provides a bearing support for the shaft 10 enclosing the gears. The quill is mounted within the housing upon suitable tapered bearings 13 and the ends of the housing through which the quill and shaft extend are provided with oil seal means indicated generally at 14.

Beyond the oil seal means there is provided an adaptor sleeve consisting of two halves 15 and 16 which are adapted to be bolted together by means of the clamp bolts 17 provided on opposed bosses formed at the adjacent ends of the two sections. This provides for firmly clamping the adaptor sleeve to the end of the quill.

Beyond the end of the quill the adaptor sleeve may be reduced as shown by the inwardly extending flange 18, and is provided with a second clamping portion 19 which has two additional longitudinally milled slots 20 formed therein, thereby providing for arcuate extending flanges, each provided with bosses 22 through which clamping bolts 23 are adapted to extend. In order to provide flexibility in each of the four sections 24 forming the annular clamping portions for the reduced part of the adaptor sleeve, the milling cutter is arranged to form a circumferential slot extending from the bossed ends of each of the sections 24 substantially to the center of the section, leaving the relatively small sections 25 interconnecting these arcuate clamping portions with the main portions 15 and 16 of the adaptor sleeve. It will be noted that between each pair of bosses 22 there is provided a milled slot allowing clearance so that upon tightening of the bolts 23 the sections 24 have a chance to move inwardly toward the center of the axle. Intermediate the external annular surface of the axle 5 and the interior clamping surface of the members 24 there is provided rubber sections or segments 26 which embrace the surface of the axle and on their outer arcuate surfaces are provided with steel plates 27 which are vulcanized to the segments, each of the segments therefore being capable of being handled as a unit during the assembly. It will be noted that the segments are offset with respect to the longitudinal slots 20 and the adjacent ends of the segments come beneath the sections 25 interconnecting the main enlarged portion of the adaptor sleeve with the axle clamping portion. This prevents any possibility of the junction between the adjacent segments being disposed at a clamping point.

To adjust the quill therefore for coaxial rotation with the shaft 5, the tightening of the bolts can be so adjusted as to provide proper compression to insure this clamping action. The interconnecting section 25 between the portions of the adaptor sleeve provide sufficient flexibility to accommodate any unevenness that would prevent the quill from running true with the axle. By the use of the rubber compression segments, the adjustment is provided while maintaining a tight fit about the axle surface. The slots 20 as well as the slots between the two halves of the adaptor sleeve provide sufficient clearance for accommodating whatever truing action is necessary.

It is therefore believed that I have provided a novel means for truing the quill of an axle generator drive with the truck axle so that the quill will run true in coaxial relation to the axle.

I do not intend to be limited to the exact details of the construction herein shown and described, but only insofar as defined by the scope and spirit of the appended claims.

I claim:

1. Means for truing a cylindrical quill on a rotatable shaft comprising a support member having two complementary halves clamped to the end of said quill, secondary portions extending axially therefrom and split into quadrant sections by longitudinally milled slots, radially milled slots in said member between said quill engaging portion and said secondary portion providing flexing connection between said portions, arcuate rubber segments about said shaft, said quadrant sections being adjustably clamped about said segments to support said quill coaxially with said shaft.

2. The quill truing means of claim 1 wherein said rubber segments are offset relative to said quadrant sections so that the joints therebetween are out of radial alinement.

3. In combination, an axle shaft, a cylindrical quill spaced radially about said shaft, means comprising a split clamping member secured to one end of said quill and having an axially extending portion, means forming said extending portion into quadrant-shaped sections adapted to be clamped together about said shaft, said sections being joined to said member through integral tongue portions formed by radially milling slots into said member beyond the end of said quill, whereby sufficient flexibility is introduced into said sections to provide for truing said quill coaxially with said shaft by the clamping action between said sections.

4. The combination of claim 3 including rubber bushing means between said sections and the surface of said shaft.

5. Means for supporting and truing one end of an elongated quill about a shaft extending therethrough, comprising a split support member forming two complementary sections clamped rigidly to the end of said quill, said sections having extended portions beyond the end of said quill so formed as to provide arcuate segments overlying said shaft and provided with clamping means at the adjacent edges of each segment, said member having radially milled slots therein intermediate said sections and segments defining integral flexible tongues interconnecting each segment with one of said sections, and rubber bushing means interposed between said shaft and segments to provide adjustable clamping of said segments about said shaft.

6. Clamping means for truing a quill about a rotatable shaft comprising a pair of complementary arcuate sections forming a cylindrical sleeve having a portion of enlarged diameter adapted to be clamped to the end of said quill, a portion of different diameter adapted to be clamped about said shaft, said different diameter portion having longitudinally fromed slots in each half section thereof to divide the same into arcuate quarter sections, and radially milled slots terminating the inner ends of said longitudinal slots to provide reduced individual integral connecting tongues between said quarter sections and the quill portion of said member.

ALFRED O. WILLIAMS.

REFERENCES CITED

The following references are of record in the file of this patent:

UNITED STATES PATENTS

| Number | Name | Date |
|---|---|---|
| 1,588,576 | Baumann | Oct. 27, 1925 |
| 2,026,076 | Spicer | Dec. 31, 1935 |
| 1,948,473 | Marshall | Feb. 20, 1934 |